(12) United States Patent
Wilbur

(10) Patent No.: US 11,241,910 B2
(45) Date of Patent: Feb. 8, 2022

(54) ROLLER ASSEMBLY

(71) Applicant: Carla Wilbur, Minneapolis, MN (US)

(72) Inventor: Carla Wilbur, Minneapolis, MN (US)

( * ) Notice: Subject to any disclaimer, the term of this patent is extended or adjusted under 35 U.S.C. 154(b) by 0 days.

(21) Appl. No.: 16/705,466

(22) Filed: Dec. 6, 2019

(65) Prior Publication Data
US 2021/0170792 A1 Jun. 10, 2021

(51) Int. Cl.
B60B 33/08 (2006.01)

(52) U.S. Cl.
CPC .................................. B60B 33/08 (2013.01)

(58) Field of Classification Search
CPC . B60B 33/08; B60B 33/0026; Y10T 16/1889; Y10T 16/19
See application file for complete search history.

(56) References Cited

U.S. PATENT DOCUMENTS

| | | | | |
|---|---|---|---|---|
| 903,850 A * | 11/1908 | Fenney | ................... | B60B 33/08 16/26 |
| 970,386 A * | 9/1910 | Nickerson | ............... | B60B 33/08 16/26 |
| 1,311,477 A * | 7/1919 | Weston | ................... | B60B 33/08 16/26 |
| 1,358,543 A * | 11/1920 | Hardon | ................... | B60B 33/08 16/26 |
| 1,854,777 A * | 4/1932 | Bales | ..................... | A47B 31/00 211/126.15 |
| 3,224,032 A * | 12/1965 | McLean | ................... | B60B 33/08 16/26 |
| 3,570,694 A | 3/1971 | Tantlinger | | |
| 5,713,382 A * | 2/1998 | Midcap | ..................... | A45B 9/04 135/44 |
| 5,727,284 A * | 3/1998 | Deutsch | ............... | A47B 91/002 16/18 R |
| 5,822,829 A | 10/1998 | Webb | | |
| 6,095,537 A | 8/2000 | Cozza | | |
| 7,328,907 B1 | 2/2008 | Bileth | | |
| 7,578,028 B2 | 8/2009 | Sellars | | |
| 7,758,076 B1 | 7/2010 | DiGiacomo | | |
| 8,028,775 B2 | 10/2011 | Orenbuch | | |
| 8,317,451 B2 | 11/2012 | Cozza | | |
| 8,628,059 B2 | 1/2014 | Hetrick | | |
| 10,094,406 B2 * | 10/2018 | Allen | ................... | B60B 33/0026 |
| 2009/0056070 A1 * | 3/2009 | James | ..................... | B60B 33/08 16/45 |
| 2012/0267488 A1 * | 10/2012 | Fanourgiakis | .......... | B60B 33/08 248/157 |

* cited by examiner

Primary Examiner — Victor D Batson
Assistant Examiner — Matthew J Sullivan

(57) ABSTRACT

A roller assembly for a storage unit enabling rolling of the storage unit on a surface includes a set of bearings and a set of couplers. The bearings are ball transfer type. Each coupler is coupled to a respective bearing and is configured to couple to a bottom of the storage unit so that the coupler is coupled the respective bearing to the bottom of the storage unit. The set of bearings is configured to facilitate rolling of the storage unit and contents thereof along the surface.

8 Claims, 7 Drawing Sheets

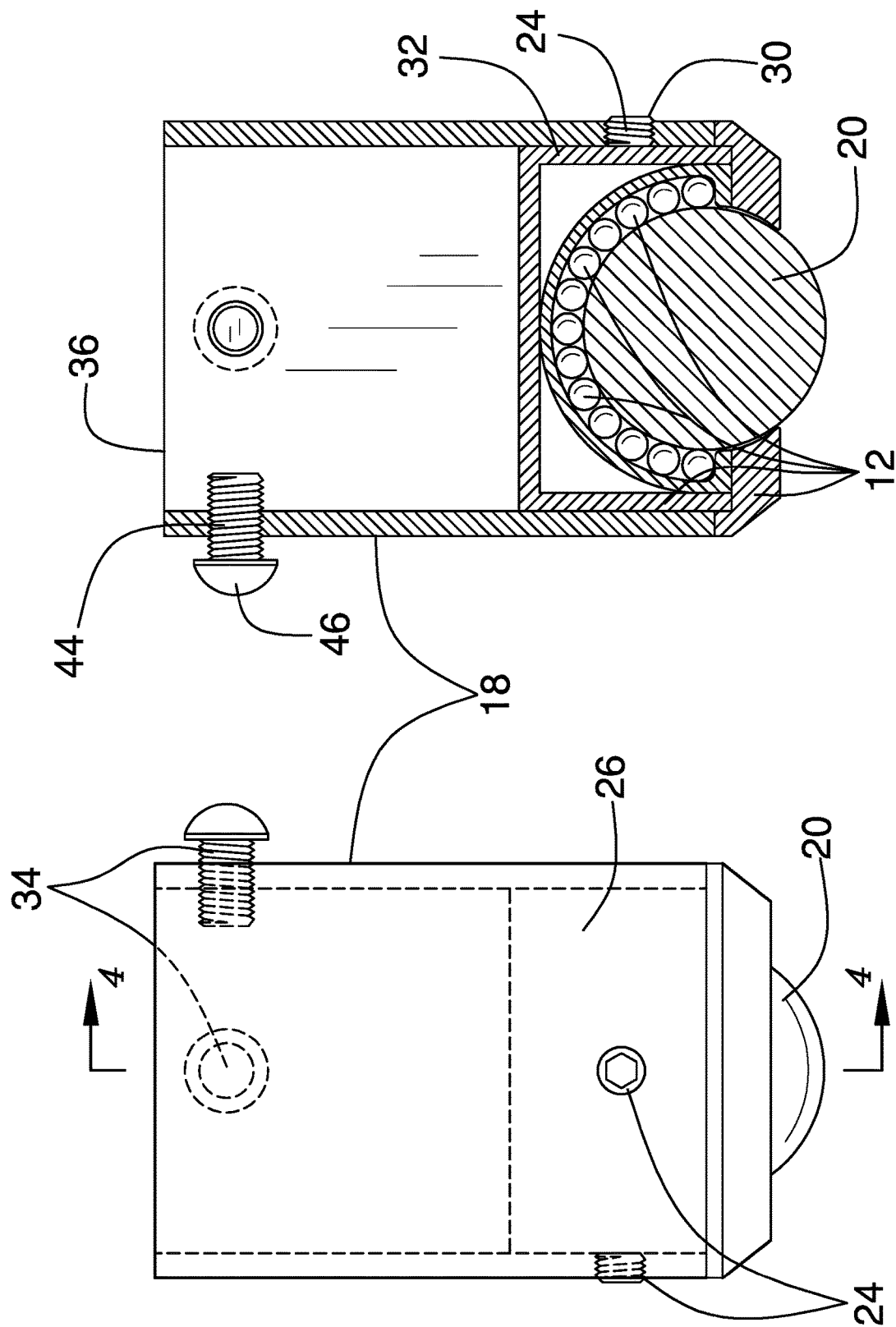

ROLLER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to roller assemblies and more particularly pertains to a new roller assembly for a storage unit enabling rolling of the storage unit on a surface.

(2) Description of Related Art Including Information Disclosed Under 37 CFR 1.97 and 1.98

The prior art relates to roller assemblies. Prior art roller assemblies for storage units generally comprise casters that are threadedly couplable to either a bottom or to lower ends of posts of the storage unit.

BRIEF SUMMARY OF THE INVENTION

An embodiment of the disclosure meets the needs presented above by generally comprising a set of bearings and a set of couplers. The bearings are ball transfer type. Each coupler is coupled to a respective bearing and is configured to couple to a bottom of a storage unit so that the coupler is configured to couple the respective bearing to the bottom of the storage unit. The set of bearings is configured to facilitate rolling of the storage unit and contents thereof along a surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a cross-sectional view of an embodiment of the disclosure.

DETAILED DESCRIPTION OF THE INVENTION

Figure 1:
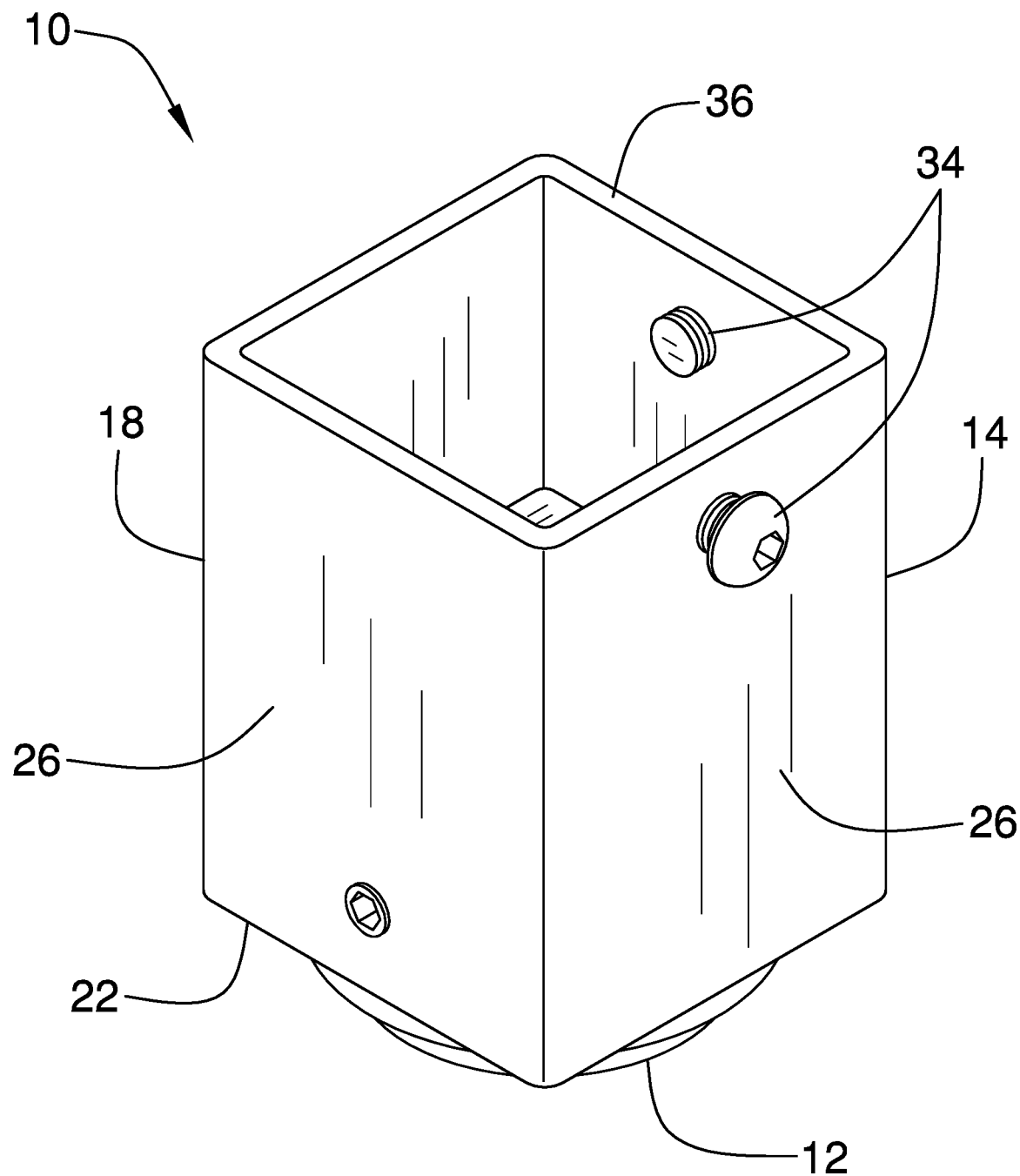
FIG. 1 is a top isometric perspective view of a roller assembly according to an embodiment of the disclosure.

With reference now to the drawings, and in particular to FIGS. 1 through 8 thereof, a new roller assembly embodying the principles and concepts of an embodiment of the disclosure and generally designated by the reference numeral 10 will be described.

As best illustrated in FIGS. 1 through 8, the roller assembly 10 generally comprises a set of bearings 12 and a set of couplers 14. The bearings 12 are ball transfer type. The bearings 12 comprises at least one of carbon steel, stainless steel, nylon, and ceramic. Each bearing 12 has a load capacity of from 45 to 450 kilograms. Each bearing 12 may have a load capacity of from 57 to 340 kilograms.

Each coupler 14 is coupled to a respective bearing 12 and is configured to couple to a bottom of a storage unit so that the coupler 14 is configured to couple the respective bearing 12 to the bottom of the storage unit. The present invention also anticipates the set of bearings 12 being integral to the storage unit. The set of bearings 12 is configured to facilitate rolling of the storage unit and contents thereof along a surface. The present invention is anticipated to be particularly useful for a storage unit, such as a shelving unit 16, that is positioned in a garage or other enclosure with a hard, substantially flat, floor.

The set of couplers 14 may comprise four couplers 14 that are configured to couple four bearings 12 to the storage unit singly proximate to each bottom corner of the storage unit. The set of couplers 14 may comprise other numbers of couplers 14 depending on the shape and size of the storage unit, such as three couplers 14, and five or more couplers 14. For example, a larger storage unit might have four couplers 14 and associated bearings 12 positioned singly proximate to the bottom corners of the storage unit and two couplers 14 and associated bearings 12 positioned singly on the bottom proximate to a front and a back of the storage unit and evenly positioned between opposing sides of the storage unit.

In the embodiment shown in FIGS. 1-8, the respective bearing 12 is drop-in type. In this embodiment, the coupler 14 comprises a sleeve 18 that is coupled to the respective bearing 12 so that a ball 20 of the respective bearing 12 protrudes from a lower end 22 of the sleeve 18. The sleeve 18 is squarely shaped when viewed longitudinally.

Figure 2:
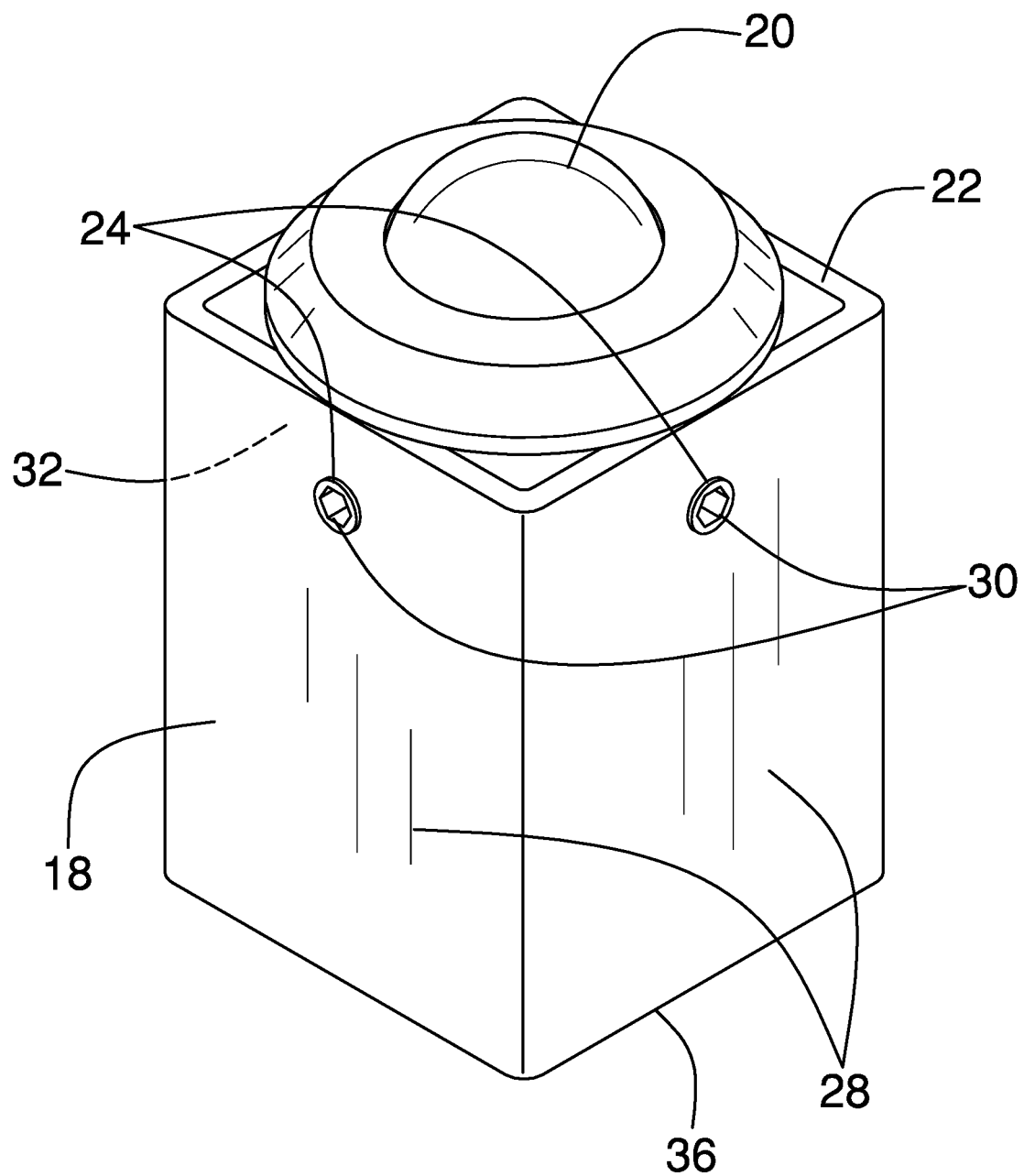
FIG. 2 is a bottom isometric perspective view of an embodiment of the disclosure.
Figure 5:
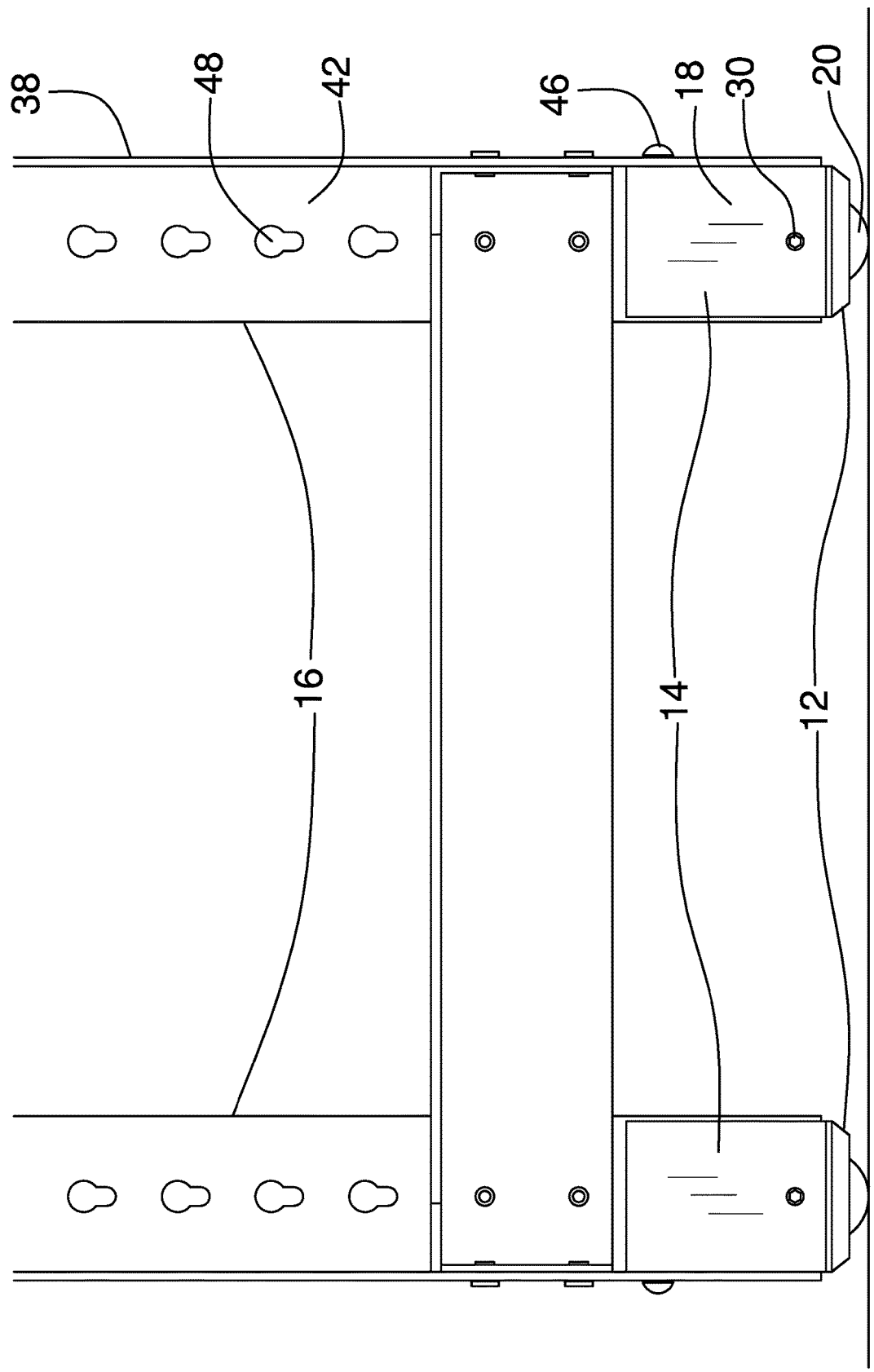
FIG. 5 is an in-use view of an embodiment of the disclosure.

Each of a set of holes 24 is positioned in a respective side 26 of the sleeve 18 proximate to the lower end 22. The set of holes 24 may comprise two holes 24 that are positioned in a first pair of adjacent sides 28 of the sleeve 18, as shown in FIG. 2. The set of holes 24 also may comprise four holes 24 that are positioned singly in each of the sides 26 of the sleeve 18. Each of a set of screws 30 is threadedly insertable into a respective hole 24 so that the screw 30 contacts a housing 32 of the respective bearing 12 to couple the housing 32 to the sleeve 18. The present invention anticipates the respective bearing 12 being integral to the sleeve 18, for example by the bearing 12 being welded to the sleeve 18.

A set of fasteners 34 is coupled to the sleeve 18 proximate to an upper end 36 of the sleeve 18. Each fastener 34 is configured to couple to a respective post 38 of the shelving unit 16. The set of fasteners 34 is configured to couple the sleeve 18 to the respective post 38 so that the ball 20 extends from the respective post 38 positioning the ball 20 to roll on the surface and thus allowing locomotion of the shelving unit 16.

Figure 6:
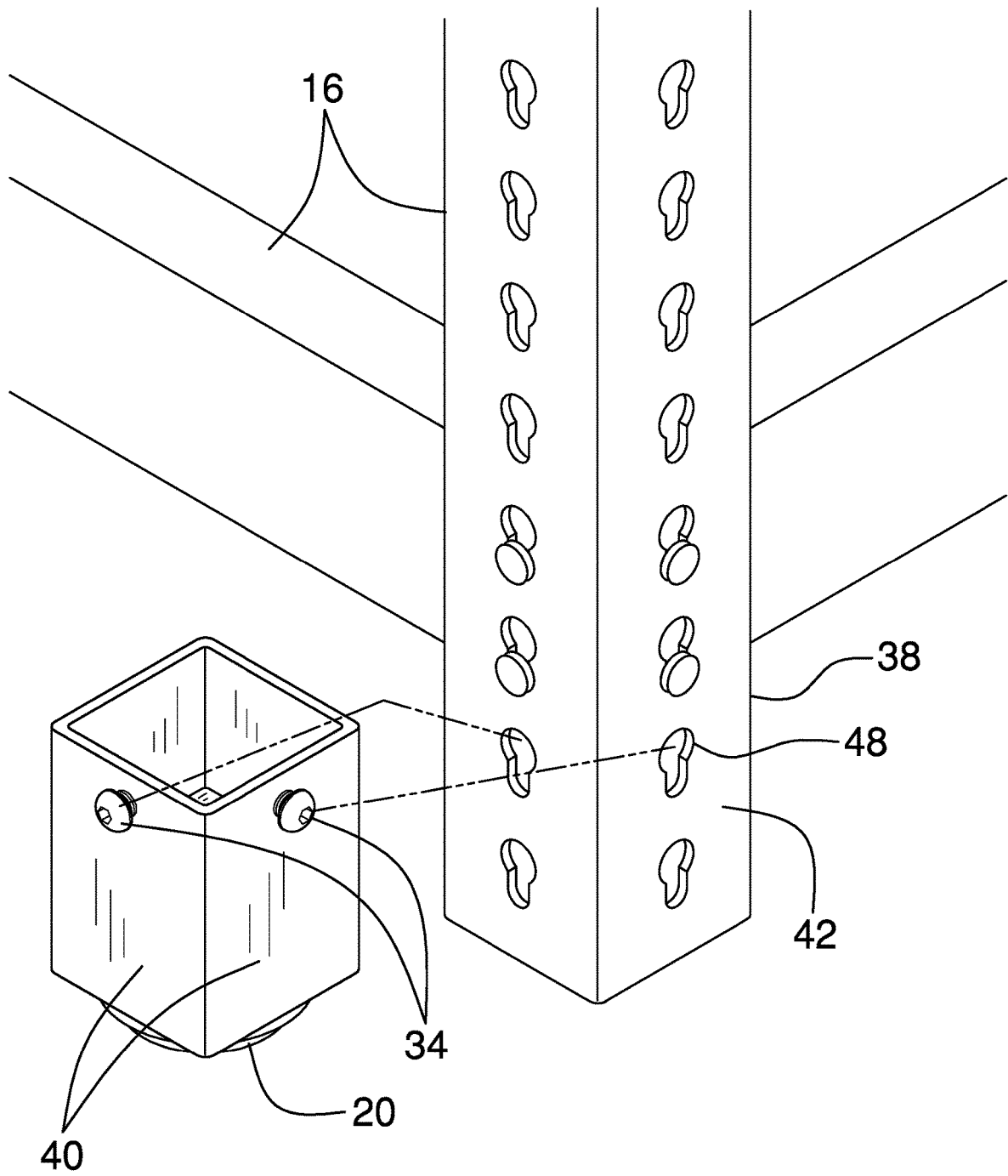
FIG. 6 is an exploded view of an embodiment of the disclosure.
Figure 7:
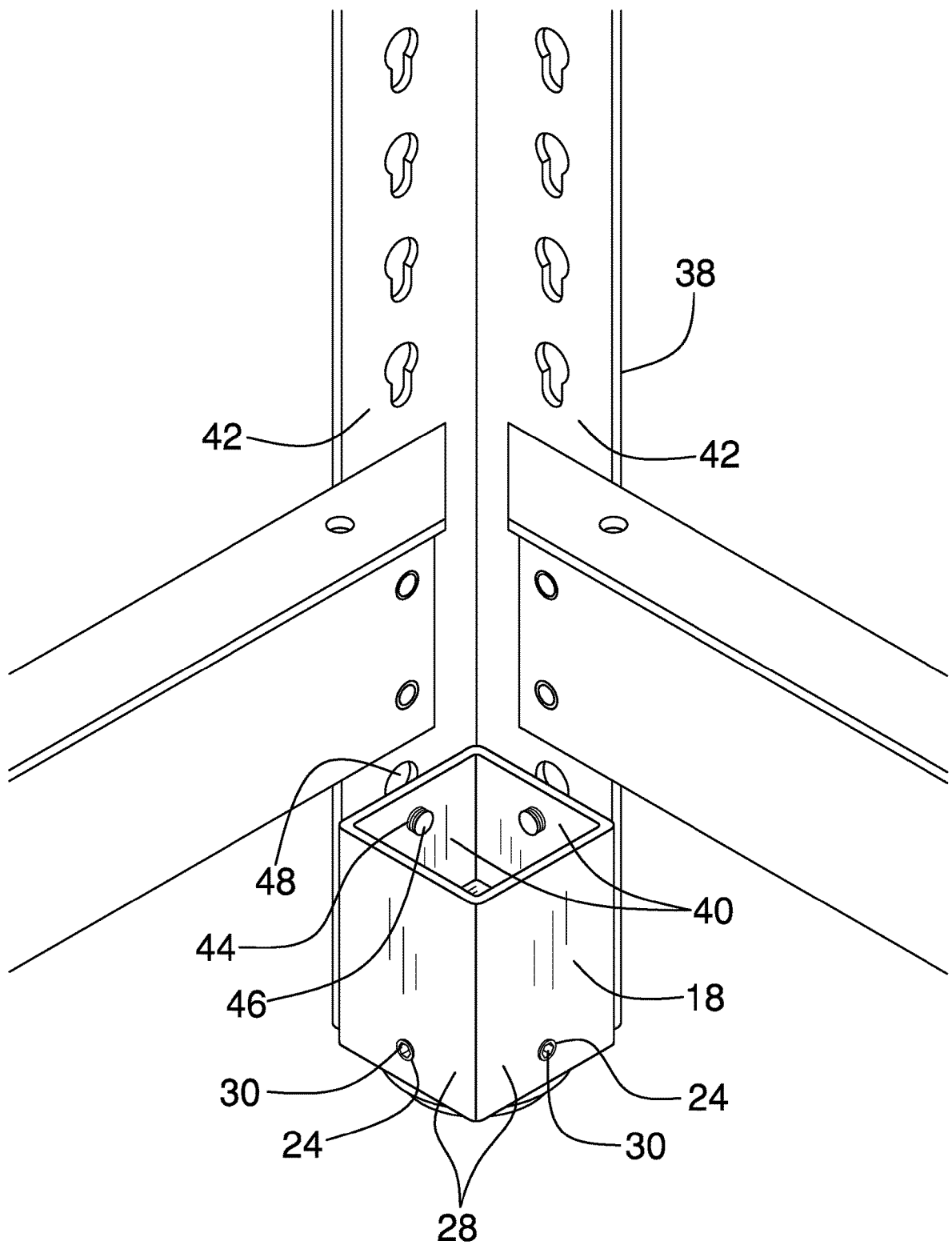
FIG. 7 is an in-use view of an embodiment of the disclosure.
Figure 8:
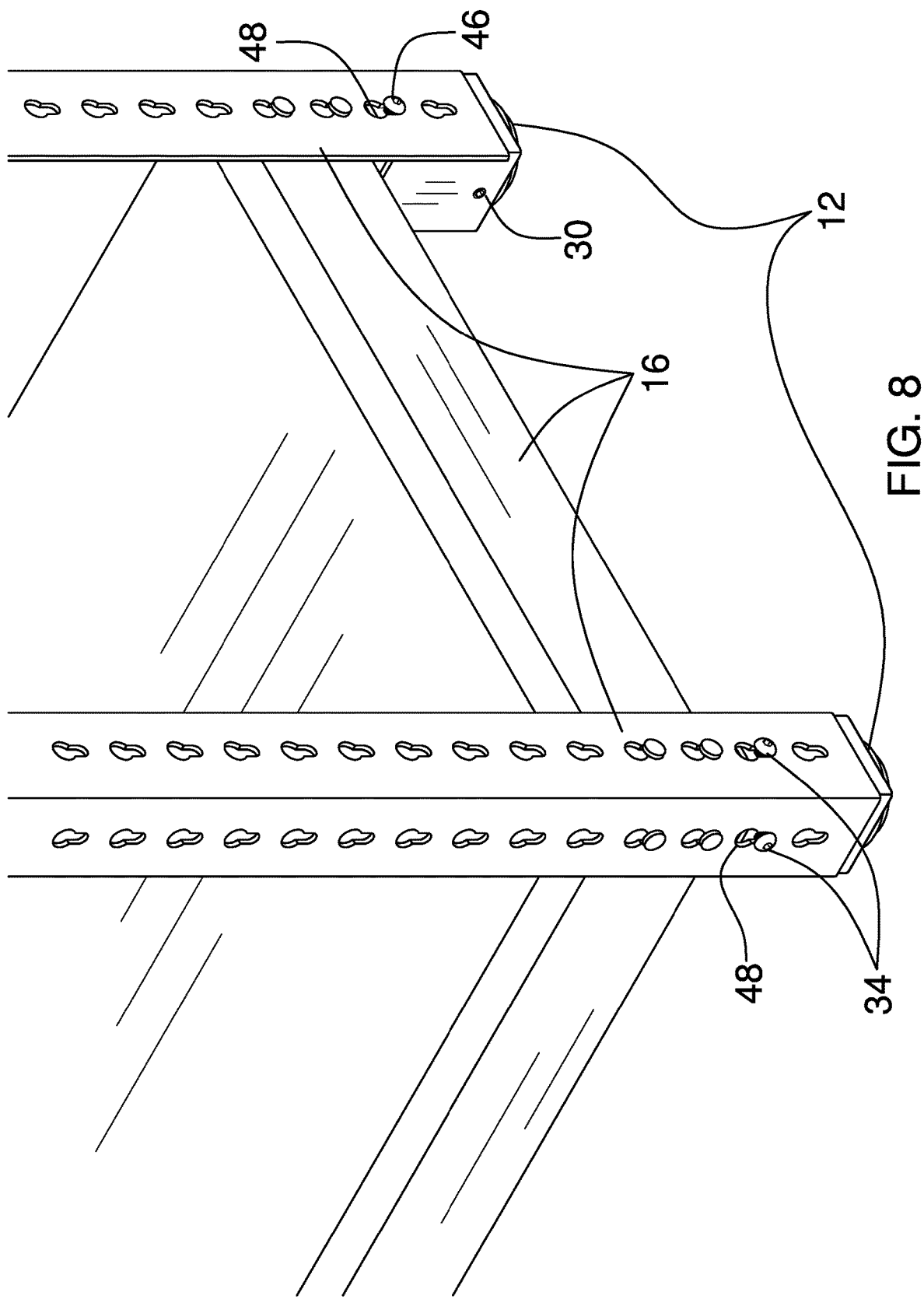
FIG. 8 is an in-use view of an embodiment of the disclosure.

The set of fasteners 34 may comprise two fasteners 34, with each fastener 34 being coupled to a respective one of a second pair of adjacent sides 40 of the sleeve 18, as shown in FIG. 6. The fastener 34 is positioned to couple to a respective sidewall 42 of a post 38 that has an L-shaped longitudinal profile. The present invention also anticipates the sleeve 18 being integral to the post 38 of the shelving unit 16, for example by the sleeve 18 being welded to the post 38 or by the second pair of adjacent sides 40 of the sleeve 18 comprising a lower segment of the post 38.

The fastener 34 comprises an orifice 44 and a bolt 46 that is complementary to the orifice 44. The orifice 44, which is threaded, is positioned in the respective one of the second pair of adjacent sides 40 of the sleeve 18. The bolt 46 is configured to be inserted through a respective keyhole slot 48 that is positioned in the respective sidewall 42 of the post 38, positioning the bolt 46 to be threadedly inserted into the orifice 44 to couple the sleeve 18 to the post 38.

The present invention also anticipates the bearing 12 being of other types, such as, but not limited to, lockable drop-in type, flange type, lockable flange type, stud mounted type, lockable stud mounted type, and the like. In the case of the bearing 12 being flange type or lockable flange type, the coupler 14 would comprise a four-holed plate (not shown) that is either coupled to or couplable to the storage unit. In the case of the bearing 12 being stud type or lockable stud type, the coupler 14 would comprise a single-holed plate (not shown) that is either coupled to or couplable to the storage unit.

In use, the sleeve 18 is positioned adjacent to a post 38 of the shelving unit 16 so that each orifice 44 is aligned with a respective keyhole slot 48. Each bolt 46 is inserted through a respective keyhole slot 48 and threadedly inserted into an associated orifice 44 to couple the sleeve 18 to the post 38. The ball 20 of the bearing 12 that is coupled to the sleeve 18 extends from the post 38. With four sleeves 18 coupled singly to the posts 38 of the shelving unit 16, the shelving unit 16 can be positioned upright with the ball 20 of each bearing 12 contacting the surface. The shelving unit 16 and contents thereof thus can be rolled upon the surface.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A roller assembly comprising:
   a set of bearings, the set of bearings of a ball transfer type, a drop-in type, and having a housing; and
   a set of couplers, each coupler being coupled to a respective bearing, the coupler configured to couple to a bottom of a storage unit each coupler comprising:
   a sleeve coupled to the respective bearing such that a ball of the respective bearing protrudes from a lower end of the sleeve, the sleeve being squarely shaped when viewed longitudinally;
   two set screw holes, each set screw hole positioned in a respective side of a first pair of adjacent sides of the sleeve proximate to the sleeve lower end;
   a first plurality of set screws, each set screw threadedly inserted into a respective set screw hole such that the set screw contacts the housing of the respective set of bearings to couple the set of bearings to the sleeve; and
   a pair of fasteners coupled to the sleeve proximate to an upper end of the sleeve, each fastener having a first portion spaced apart from a surface of the sleeve to receive an edge of a keyhole slot aperture in a respective flange of an L-shaped angle post of the storage unit to couple the respective flange between the respective side of the sleeve and the first portion of the fastener by insertion of each fastener through the keyhole slot apertures such that the ball extends from the respective L-shaped angle post for rolling on a surface,
   wherein each fastener in the pair of fasteners is coupled to a respective side of a second pair of adjacent sides of the sleeve, and
   wherein the first and second pairs of adjacent sides of the sleeve do not have a side in common.

2. The assembly of claim 1, further including the bearing comprising at least one of carbon steel, stainless steel, nylon, and ceramic.

3. The assembly of claim 1, further including each bearing having a load capacity of from 45 to 450 kilograms.

4. The assembly of claim 3, further including each bearing having a load capacity of from 57 to 340 kilograms.

5. The assembly of claim 1, further including the set of couplers comprising four couplers wherein the set of couplers is configured for coupling four bearings to the storage unit singly proximate to each bottom corner of the storage unit.

6. The assembly of claim 1, wherein the fastener comprises:
   an orifice positioned in each side of the second pair of adjacent sides of the sleeve, the orifice being threaded; and
   a bolt threadably disposed in each orifice wherein the first portion of the fastener is a head of the bolt configured to be received in a respective keyhole slot aperture positioned in the respective flange of the post to couple the sleeve to the post of the storage unit.

7. A roller assembly comprising:
   a set of bearings, the set of bearings of a ball transfer type, a drop-in type, and having a housing, each bearing comprising at least one of carbon steel, stainless steel, nylon, and ceramic, and each bearing having a load capacity of from 45 to 450 kilograms; and
   a set of four couplers, each coupler coupled to a respective bearing, each coupler configured to couple to a bottom of a storage unit proximate to a bottom corner of the storage unit, each coupler comprising:
      a sleeve coupled to the respective bearing such that a ball of the respective bearing protrudes from a lower end of the sleeve, the sleeve being squarely shaped when viewed longitudinally, two set screw holes, each set screw hole positioned in a respective side of a first pair of adjacent sides of the sleeve proximate to the sleeve lower end, two set screws, each set screw threadedly inserted into a respective set screw hole such that the set screw contacts the housing of the respective bearing to couple the bearing housing to the sleeve, and
      a pair of fasteners coupled to the sleeve proximate to an upper end of the sleeve, each fastener having a first portion spaced apart from a surface of the sleeve to receive an edge of a keyhole slot aperture in a respective flange of an L-shaped angle post of the storage unit to couple the respective flange between the respective side of the sleeve and the first portion of the fastener by insertion of each fastener through the keyhole slot apertures such that the ball extends from the respective L-shaped angle post for rolling on a surface,
   wherein each fastener is coupled to a respective side of a second pair of adjacent sides of the sleeve, wherein the first and second pairs of adjacent sides of the sleeve do not have a side in common,
   each fastener comprising:
      a threaded orifice positioned in a respective side of the second pair of adjacent sides of the sleeve, and
      a bolt threadably disposed in each orifice wherein the first portion of the fastener is a head of the bolt configured to be received in a respective keyhole slot aperture positioned in the respective flange of the post to couple the sleeve to the post of the storage unit.

8. A roller assembly for a storage unit having a plurality of L-shaped posts, the roller assembly comprising:
   a sleeve having four sides, a lower end, and an upper end, wherein:
      the sleeve is squarely shaped when viewed longitudinally, and
      an angle between any two adjacent sides is the same as an angle between adjacent sidewalls of each L-shaped post of the storage unit;
   a ball-bearing assembly, having a roller ball extending therefrom, coupled to the lower end of the sleeve, and oriented such that the roller ball extends beyond the lower end of the sleeve in a direction away from an interior of the sleeve;
   first and second fasteners disposed, respectively, on first and second adjacent sides of the sleeve, each fastener comprising:
      a threaded orifice defined in the respective sleeve side; and
      a bolt threadably inserted in the respective orifice,
   wherein the orifice is positioned a first predetermined distance from the sleeve upper end,
   wherein the first predetermined distance is such that the orifice aligns with a respective keyhole slot defined in adjacent sidewalls of the storage unit posts, and
   wherein the bolt comprises a first portion to capture a storage unit post sidewall between the bolt first portion and the respective sleeve wall when the bolt is inserted through the respective keyhole slot and screwed into the orifice, and
   wherein the first predetermined distance is set such that when the sleeve is positioned adjacent a respective L-shaped post, and the bolt is inserted through the respective keyhole slot and screwed into the orifice to capture the respective post sidewall, the roller ball extends from an end of the respective L-shaped post to facilitate movement of the storage unit along a surface.

* * * * *